United States Patent [19]

Bowater et al.

[11] Patent Number: 6,052,367

[45] Date of Patent: Apr. 18, 2000

[54] CLIENT-SERVER SYSTEM

[75] Inventors: Ronald John Bowater, Romsey; Michael Cobbett, Eastleigh; Lawrence Leon Porter, Lyndhurst, all of United Kingdom; Mervyn Anthony Staton, Sunnyvale, Calif.

[73] Assignee: International Business Machines Corp., Armonk, N.Y.

[21] Appl. No.: 08/777,723

[22] Filed: Dec. 20, 1996

[30] Foreign Application Priority Data

Dec. 29, 1995 [GB] United Kingdom ............... 9526663

[51] Int. Cl.[7] .................................................. H04L 12/66
[52] U.S. Cl. ......................................... 370/352; 709/203
[58] Field of Search .......................... 370/351, 352–356, 370/428, 429; 379/93–100, 88, 89, 90; 395/200.3, 200.31, 200.32, 200.33; 709/203, 200

[56] References Cited

U.S. PATENT DOCUMENTS

| | | | |
|---|---|---|---|
| 5,608,786 | 3/1997 | Gordon | 379/100 |
| 5,675,507 | 10/1997 | Bobo, II | 364/514 R |
| 5,764,910 | 6/1998 | Shachar | 395/200.53 |
| 5,802,518 | 9/1998 | Karaev et al. | 707/9 |
| 5,884,032 | 3/1999 | Bateman et al. | 395/200.34 |

Primary Examiner—Ajit Patel
Attorney, Agent, or Firm—Jerry W. Herndon

[57] ABSTRACT

Using the Internet World Wide Web (WWW) network 320, a WWW Client 310 can communicate with a WWW Server 330 to request the reconfiguration of or to generate software which controls a voice processing application. A voice response system client communicates with a voice response system server to alter the configuration of the voice response system or control the execution of software on said voice response system which enables a voice application program to be generated. The output of the voice response system ordinarily destined for display on a visual display unit of a local terminal is directed to the voice response system server. The voice response system server forwards the data to a voice response system client. The voice response system client generates data in a first format useable by said WWW client terminal from data in a second format received from said voice response system and generates data in said second format useable by said voice response system from data in said first format received from WWW client terminal, that is, the voice response system client dynamically generates HTML data from the data generated by the voice response system for transmission to and subsequent display at the WWW client terminal and visa versa.

4 Claims, 4 Drawing Sheets

FIG. 6

CLIENT-SERVER SYSTEM

TECHNICAL FIELD

The present invention relates to a client-server system for interfacing between an Internet World Wide Web client terminal and a voice response system, and in particular to improving the way in which such voice response systems can be accessed and configured.

BACKGROUND OF THE INVENTION

Voice response systems (also termed voice messaging systems, voice mail systems or voice response units) attach to the telephone network, often via a PBX, and can be used to store messages from incoming calls when the intended addressee is unable to personally answer the call. The intended addressee can then listen to their stored messages at some future time. A voice response system is generally implemented using either a special purpose computer or a standard computer workstation equipped with a suitable telephony interface. Such voice response systems are well-known; one example is the DirectTalk/6000 voice response system available from IBM Corporation. Other examples of voice response systems are described in, for example, U.S. Pat. No. 5,136,648 and EPA 0588576.

Voice response systems are used by large organisations, such as banks, insurance companies and the like, which have, as part of their daily operation, a need to deal effectively with a significant number of telephone enquiries. The voice response systems used by these companies are arranged to provide various telephony and call answering functions, such as providing automatic telephone responses to callers dialling from a conventional telephone, screen phone, fax machine or personal computer, by way of control or voice applications. A control or voice application governs the operation of the voice response system and may be executed whenever an incoming call is detected and enables the voice response system to answer the incoming call, output various voice menus to the caller, receive inputs, such as DTMF tones or voice, from the caller, perform functions according to the inputs etc. As an example, a voice application program can be designed which will allow a caller to dial their bank to enquire as to the status of their account and allow the voice response system to output that status over the telephone line. A voice application can be built up from voice application primitives. The primitives provide specific functions such as detecting a DTMF tone or outputting a voice segment to the caller's telephone.

Conventionally, voice response systems provide a graphical user interface to allow the system to be programmed by people who do not necessarily have extensive programming skills. The primitives or functions are presented graphically and the programmer selects the desired functions in the order in which execution is preferred. Once all primitives have been selected they are saved and together constitute a voice application program. The DirectTalk/6000 voice response system from IBM Corporation provides a Voice Application Generator to facilitate the above. Further details of the Voice Application Generator are available in the Voice Application Development Guide SC22-0102 available from IBM Corporation.

The graphical user interface may comprise, for example, X-Windows, Motif and OS/2 Presentation Manager or a direct Windows interface, that is to say, an interface which executes on the voice response system itself or on a workstation connected to a local area network to which the voice response system is also connected.

For those companies providing a centralised service or those which contract out their voice response system needs, the provision of access to their voice response system represents a significant problem. A user, such as a bank, of such a centralised or outsourced voice response system may be a great distance from the voice response system. Any interaction with the voice response system would require either personnel to be sent to the location of the voice response system to use a locally connected terminal or a leased line connection between a terminal of the user and the voice response system. The use of such a leased line connection is very expensive and also requires a terminal which is capable of running a platform specific windowing system, such X-Windows, to be able to access the user interface of the remote voice response system.

SUMMARY OF THE INVENTION

Accordingly, the present invention provides a client-server system for interfacing between a WWW client terminal arranged to access said client-server system via the Internet World Wide Web and a voice response system having a voice response system server, comprising generation means for generating data in a first format useable by said WWW client terminal from data in a second format received from said voice response system and for generating data in said second format useable by said voice response system from data in said first format received from WWW client terminal.

The invention exploits the fact that a World Wide Web (WWW) front end (also known as a Web Browser) is already available for most commercially significant platforms for general access to the WWW. As the format of the data used and produced by the Web Browser is independent of the platform upon which it is running, the graphical user interface is accordingly independent of the platform or WWW client terminal utilised to access the voice response system. Therefore, there is no need to develop or maintain separate front ends into the voice response system, but rather generally available client software can be used. It is very likely that in future years WWW client software will be pre-loaded into almost all new computer workstations, so that access via the WWW will eventually be available from the vast majority of computers across the world. Furthermore, users are already familiar with the WWW, so that very little additional training is required. Still further, the present invention obviates the need for a user's WWW client terminal to support a platform specific windowing system, such as X-Windows, in order to be able to interact with a voice response system.

It will also be appreciated that the Internet provides all the networking required to support the WWW, effectively transparently to the user. Thus a remote user can obtain access to the voice response system through the WWW quickly and easily, without requiring any knowledge of the underlying network structure that is supporting this connection (eg which gateways to use, and so on). It will further be recognised that exploiting the Internet infrastructure is a very cost-effective way of communicating between sites as compared to the use of, for example, leased lines.

In many instances the users of such voice response systems may desire to reconfigure the voice response system. Again, an interaction with a voice response system, such as reconfiguring various operational parameters, suffers from the same problems set out above.

Suitably, an embodiment of the present invention provides a system wherein said generation means is arranged, in response to data in said first format originating from said WWW client terminal, to generate modifying data in said second format for use by said voice response system to modify data used by said voice response system.

The above embodiment advantageously allows remote modification of parameters or configuration data via the Internet. Furthermore, as a Web browser is used as the interface to the voice response system, any such modification can be effected using a conventional computer having access to the Internet.

As well as modifying operational or configuration data, it is also desirable to be able to modify or develop voice applications which govern the operation of the voice response system. Typically, any such modification or development requires access to the voice response system by way of a locally connected terminal or a leased line. In some instances, it may be possible to develop an application on a local duplicate voice response system and then to down-load the newly modified or developed application. The above options are costly in terms of required hardware or leased lines.

Accordingly an embodiment of the present invention provides a client-server system, wherein said generation means is arranged, in response to data in said first format originating from said WWW client terminal, to generate data in said second format for use by said voice response system to generate an application capable of influencing the operation of said voice response system.

Again, some of the advantages enumerated above equally ensue when using the Internet as a means of remotely programming a voice response system.

BRIEF DESCRIPTION OF THE DRAWINGS

Embodiments of the invention will now be described, by way of example only, with reference to the following drawings in which:

FIG. 6 shows a page for editing the pack configuration of the voice response system.

DETAILED DESCRIPTION

Figure 1:
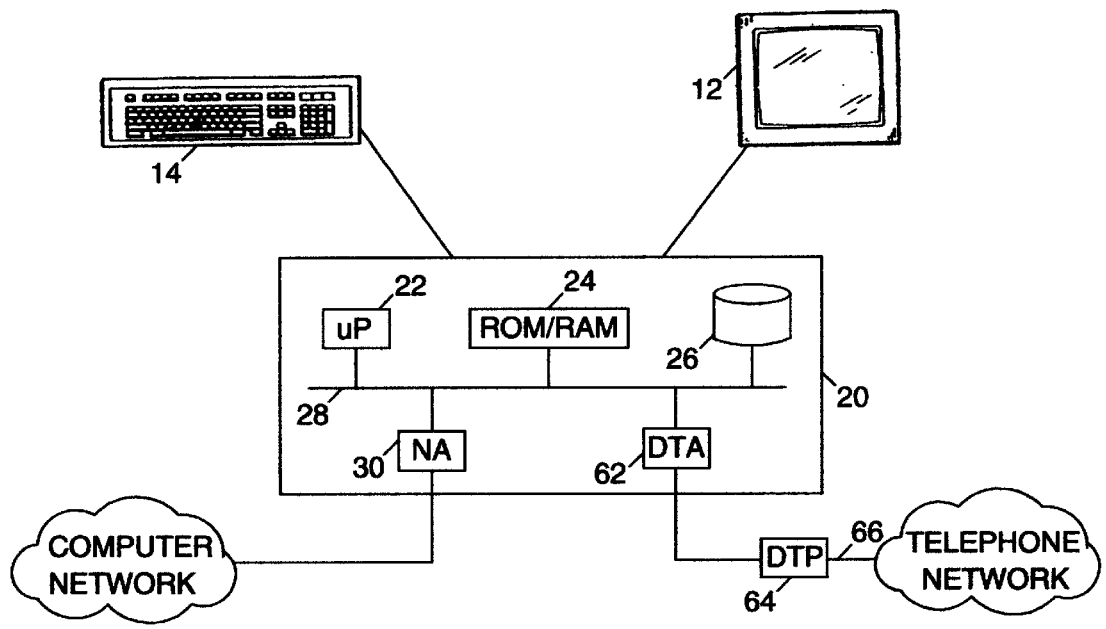
FIG. 1 is a simplified diagram of a voice response system.

FIG. 1 is a simplified diagram of a voice response system based on a conventional computer workstation comprising system unit 20, display screen 12, and keyboard 14. The system unit includes a microprocessor 22, ROM/RAM 24, and disk storage 26, connected together via bus 28. To operate as a voice response system, the computer workstation is connected to telephone line 66 via a digital trunk processor 64 and a digital trunk adapter card 62. The voice response system also includes a network adapter card 30 to allow connection to a computer network (eg a LAN).

The voice response system illustrated in FIG. 1 is based on the DirectTalk/6000 voice response system, available from IBM Corporation. The hardware components of this system are a RISC System/6000 computer workstation, plus the digital trunk processor and digital trunk adapter. The DirectTalk/6000 system connects to the telephone network through a T1 or E1 digital trunk line 66 (via a PBX in most installations). The digital trunk processor 64 is used to demultiplex incoming signals and multiplex outgoing signals on the trunk line, and to perform log-linear conversion as appropriate. The digital trunk processor is also used to perform compression and decompression of data. The digital trunk adapter 62 effectively acts as an interface between the workstation itself and the digital trunk processor. Further details of the DirectTalk/6000 voice response system can be found in the manual "IBM Callpath DirectTalk/6000, General Information and Planning" (publication number GC22-0100-04) and the other manuals referenced therein available from IBM corporation.

Figure 2:
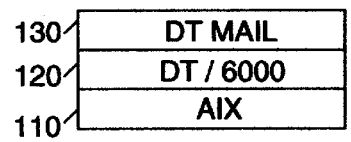
FIG. 2 is a simplified diagram of the main software components of the voice response system of FIG. 1.

FIG. 2 is a simple block diagram of the main software components running on the voice response system of FIG. 1. Running on the RISC System/6000 is first of all the operating system for the workstation, which in the present case is the AIX operating system 110, and then the DirectTalk/6000 software 120 itself. Optionally, other applications can run on top of the DirectTalk/6000, for example, DirectTalk-Mail 130, which provides standard voice messaging capabilities, this being one of a plurality of possible other applications.

Voice response systems such as those schematically illustrated in FIGS. 1 and 2 are well-known, and many variations thereof are also well-known. For example, there are many systems in which the telephone line 66 is analog and hence the digital trunk processor is omitted, and its functions are performed, where appropriate, by a suitable telephony adapter card.

Figure 3:
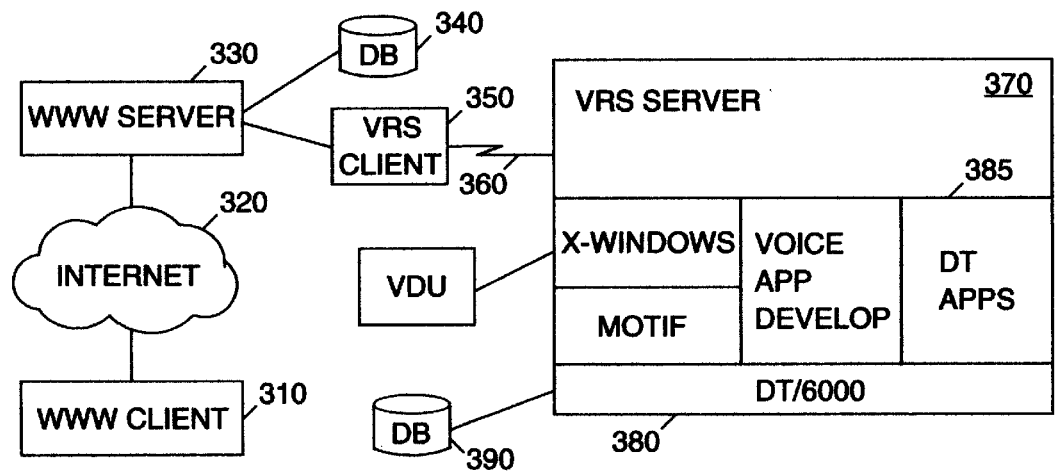
FIG. 3 is a schematic diagram of a system to provide access to the voice response system over the Internet World Wide Web (WWW)

FIG. 3 illustrates schematically an architecture whereby access can be provided to voice response systems over the Internet World Wide Web (WWW). A user at a WWW client terminal 310 can access their voice response system through the Internet WWW communication network 320 and a WWW server 330. The WWW server 330 in turn is attached to an voice response system (VRS) client 350 which communicates with a voice response system server 370 via communication link 360. The latter comprises an application running on the DirectTalk/6000 voice response system and is used to obtain access to the voice response system or to generate configurational or control data which is capable of influencing the operation of the voice response system.

The Internet uses Uniform Resource Locators (URLs), which can be regarded as specifying a particular file or page located on a server attached to and accessible by the WWW. The URL denotes both the server machine, and the particular file or page on that machine. There may be many pages or files resident on a single server which can be accessed using URLs. If a user at a WWW client terminal 310 selects a URL on a WWW server 330, then that WWW server 330 performs an specific action in relation to that page or file. In some instances the action may result in the WWW server 330 instigating the execution of or launching of an application. In the majority of cases, however, the WWW server 330 retrieves the requested page or file from a database 340 of stored pages or files, and transmits it over the WWW 320 to the WWW client terminal for display to the user thereof. The pages are described in accordance with a standard format known as HTML as is well known within the art Optionally, many pages include images which are stored in separate graphics files at the server, for example in standard ".gif" or ".jpeg" format. The HTML text contains references to these graphics files, which prompt the WWW client 310 to also retrieve the specified files from the WWW server 330, thereby allowing the WWW client 310 to display both the HTML text and associated images.

The WWW client 310 provides the user with a simple platform independent graphical user interface, GUI, which allows the user to navigate the WWW 320 using different URLs. Although a user can specify a particular URL by name it is more conventional for a user to access other pages or files by means of URL references within the current page (said other references are known as so-called "hyperlinks"). Thus a particular word or symbol on a page can be associated with another URL, so that selection of that word or symbol, eg by clicking a mouse at the relevant location, causes the WWW client terminal to instigate access to and subsequently display the page or file designated by the selected URL. The new page or file may be located on a completely different server to the preceding page. Words or symbols which map to another URL are sometimes referred to as "hot buttons" or hyperlinks as is well known within the art. There may be many such hot buttons or hyperlinks within a single page.

There are a variety of WWW clients 310 commercially available, for example Web Explorer from IBM Corporation, and Mosaic from NCSA. All such WWW clients 310 utilise HTML to display or output files according to the HTML format. Similarly, the mechanisms for navigating between different URLs are also understood and implemented by such programs. Further information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994).

In order to access their voice response system over the WWW, a user needs to know firstly the URL corresponding to the voice response system. The URL used to access the voice response system is independent of the location of the user's WWW client terminal 310 (unlike a telephone number, where local/district codes may be dropped, and international access codes may vary). When the user enters the URL of the voice response system a request is passed to the WWW server 330. The WWW server 330, in response to the request, retrieves a corresponding HTML file from the database 340. The HTML file when displayed at the WWW client terminal 310 will produce a screen layout similar to that depicted in FIG. 4. At the top of the screen is a control bar 410, which is provided in known fashion by the WWW client terminal 310 to allow the user to control their interaction with the WWW 320. For example, buttons not shown, on the control bar may be used to return to a previously accessed page, to abort access to the currently requested file, to display the location of the URL of the current page, and so on. In terms of the information actually supplied by the WWW Server 330, apart from a general welcome message, the user is presented with a plurality of options from which a selection can be made. The options are presented in the form of hot buttons, or hyperlinks 430, which the user selects to obtain remote access to predetermined features of the voice response system or to further HTML files.

Figure 4:
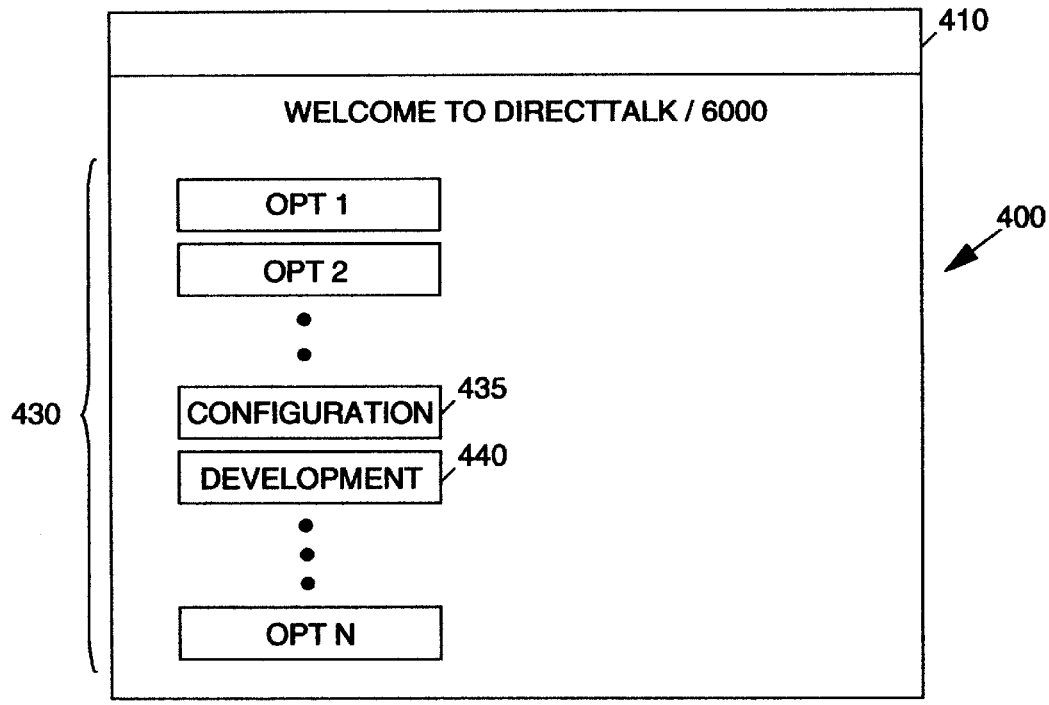
FIG. 4 illustrates a Welcome page of the voice response system.

If one of the plurality of hyperlinks 430 is activated, the WWW client terminal 310 transmits a message to this effect to WWW server 330. The message includes at least an identification, or the URL, of the hyperlink selected. In the present embodiment the WWW server 330 is the host for both the page shown in FIG. 4, and for the hyperlinks 430, although other embodiments can be realised in which this is not the case. The WWW server 330, as resident target for the hyperlinks 430, maintains information to allow a determination to be made as to whether the URL corresponds to another HTML file stored on the data base 340 (such as depicted in FIG. 4) or some other resource such as an executable application. In the latter case, in response to activation of the selected hyperlink, the WWW server 330 identifies and launches the application corresponding to the selected hyperlink URL. This application is shown in FIG. 3 as voice response system (VRS) client 350, that is, an application which is capable of communicating with a voice response system or an application resident on the voice response system. In the present embodiment the VRS client 350 is situated on the same machine as the WWW server 330. The VRS client 350 acts as an interface between the WWW server and the voice response system. The VRS client manages the exchange of data between the voice response system and the WWW server 330 by generating HTML data from data in a format received from the voice response system and vice versa.

The VRS client 350, when activated, initiates communication with another application, a voice response system (VRS) server 370, which, as shown in FIG. 3, effectively runs on top of the voice response system 380, in parallel with any other concurrently executing applications 385. To instigate such communication, the VRS client uses a network address and predetermined port number for VRS server 370 thereby allowing a standard UNIX socket connection to be used there between. The VRS client and VRS server can then communicate in known manner.

It is generally convenient for the VRS client and VRS server to be situated in the same location. This allows the link 360 therebetween to be a relatively short and simple connection, permitting high bandwidth communication, and it is generally easier from a practical point of view to maintain compatibility between the VRS client and VRS server if they are reasonably near to one another. In other circumstances they may be at separate locations, and there may be multiple WWW servers and VRS clients served by a single VRS server.

On receipt of a request or message from the WWW Server, the VRS server 370 retrieves the information from a data base of the voice response system identified in the request, such as information relating to the configuration of the voice response system. In order to do this, the VRS server is provided with the same knowledge of the structure of the data bases 390 of the voice response system as DirectTalk/6000 itself. This knowledge allows the VRS server to interrogate and access the data bases of the voice response system in the same manner as said other DirectTalk/6000 system. Any information retrieved by VRS server 370 is then returned to the VRS client 350 using standard UNIX facilities for passing data over TCP/IP sockets.

The VRS client then formats the retrieved information to produce an HTML file or generates a suitable HTML file according to the content of the data received from the VRS server 370. The HTML file is forwarded to the WWW server 330, and from there across the WWW to the WWW client terminal 310. Note that as far as VRS client is concerned, the HTML page is simply written to a standard output port For example, if the VRS client is implemented using the C programming language, it is sufficient to use the printf command in a manner which is well known within the art. The WWW server 330 then instigates the delivery of the HTML file to the WWW client terminal 310, in accordance with standard WWW server operation.

Figure 5:
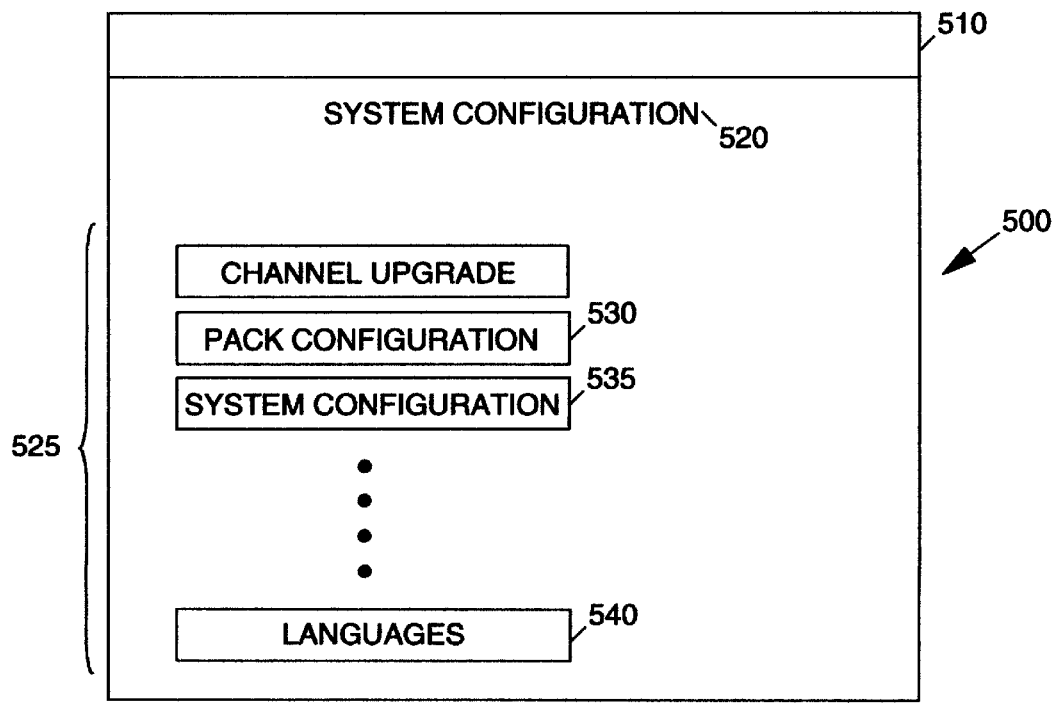
FIG. 5 shows the result of selecting the "Configuration" hyperlink depicted in FIG. 4.

FIG. 5 is an illustration of the output produced by such an HTML file. The screen 500 of FIG. 5 includes the WWW client terminal control bar 510, as previously discussed in relation to FIG. 4, plus information particular to this URL. Thus a header 520 indicates that the page relates to system configuration. Next are the hyperlinks 525 listing the aspects of voice response system configuration which can be remotely modified. These hyperlinks 525 include, inter alia, links relating to pack configuration 530, system configuration 535 and languages 540 as are well understood within the DirectTalk/6000 voice response system. The user can select one of the given hyperlinks according to which aspect of system configuration is desired to be examined or changed. Again, there is associated with each of the hyperlinks 525 a respective URL as specified in the HTML page output by the VRS client 350.

It will be understood that FIG. 5 is effectively the page of data corresponding to hyperlink 435, that is, configuration data. In principle it would be possible to request the URL corresponding to FIG. 5 directly, rather than via hyperlink 435, using standard WWW navigation facilities. However, such direct access is less flexible in terms of WWW navigation than the indirect hierarchical access described above.

Thus in order to access a particular aspect of configuration data, the user selects the corresponding hyperlink. This results in a request for that URL being transmitted over the WWW to the WWW Server. The WWW Server again determines that the URL corresponds to the VRS client and forwards the request thereto. The VRS client 350 generates data useable by the voice response system and forwards that data to the VRS server 370. The generated data indicates to the VRS server 370 that configuration data is required. The VRS server 370 uses the above request to retrieve that aspect of configuration data from the database. That aspect of configuration data is then transmitted to the VRS client 350 using standard UNIX communication facilities. The VRS client 350 then generates an HTML file suitable for displaying the configuration data and transmits it to WWW server 330, for forwarding to and subsequent display at the WWW client terminal 310.

It will be appreciated that the HTML files are dynamically generated according to the data received from the voice response system.

Figure 6:
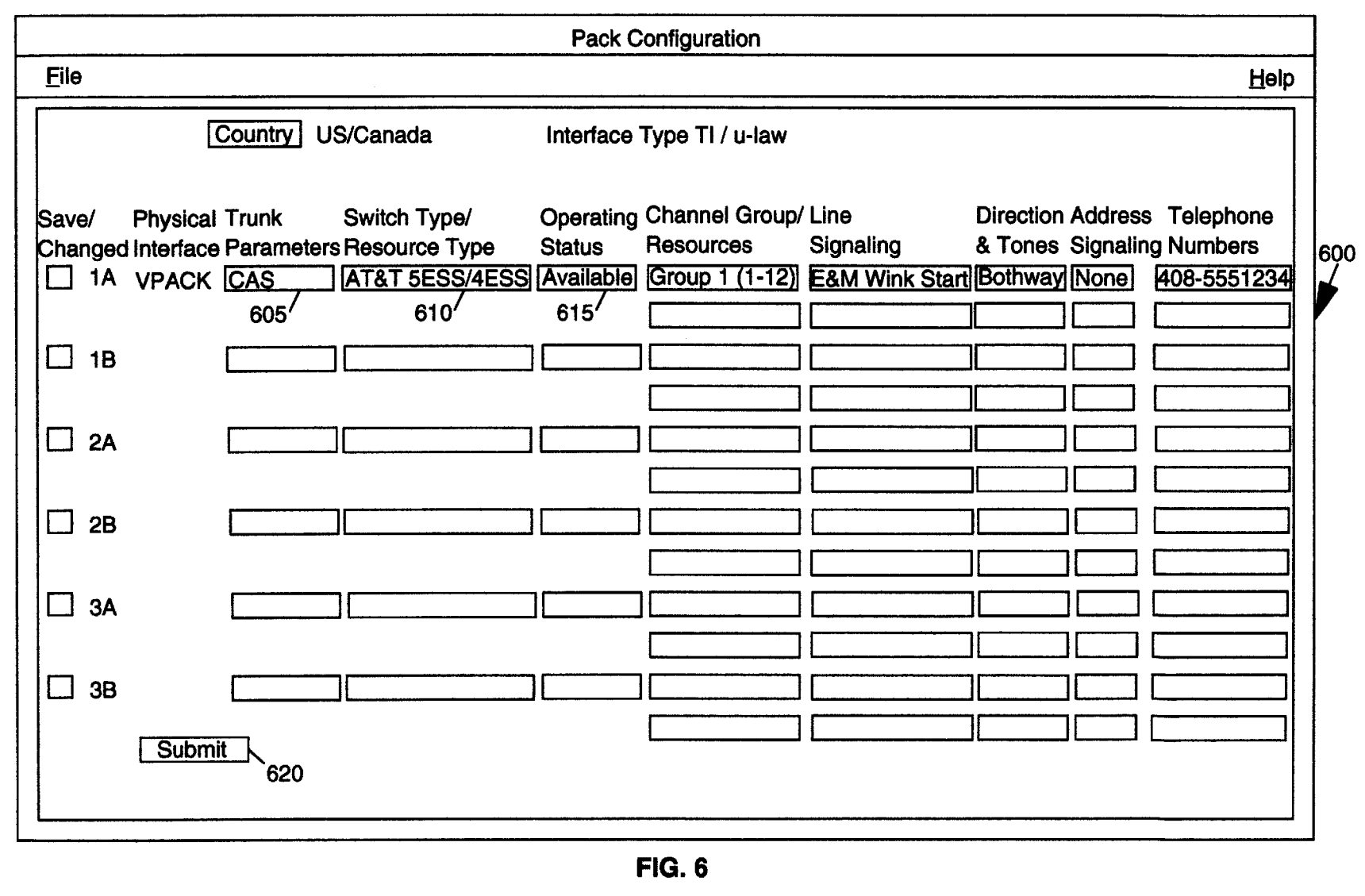

Assume that the user has selected the hyperlink relating to pack configuration, that is, hyperlink 530. Data relating to the current pack configuration is retrieved in the manner described above and sent, via the VRS server 370, to the VRS client 350. The VRS client 350, using the retrieved data, produces an HTML file suitable for displaying the pack configuration data. In the present case, each data element of the pack configuration data which can be changed is arranged to be displayed in an edit box so that the user can amend the data elements. Again, the VRS client 350 then transmits an appropriate HTML file to the WWW server 330 for forwarding to and subsequent display at the WWW client terminal 310. An example of a page 600 accommodating fields capable of being edited is schematically shown in FIG. 6. The fields depicted relate to, for example, the trunk parameters 605, the switch type 610, and the operating status 615 of the switch. Once the parameters have been edited, the WWW client terminal 310, at the instigation of the user using the submit button 620, submits an HTML file containing the new parameters back to the WWW server 330. The WWW server 330 again determines that the HTML file is destined for the VRS client 350 and routes the file accordingly. The VRS client 350 generates from the HTML file data in a format suitable for use by the voice response system 380 and transmits the generated data to the VRS server. The VRS server 370 then stores the parameters in an appropriate data base 390 of the voice response system for future use in configuring the system.

When an incoming telephone call is subsequently detected, the newly changed parameters may influence the interaction of the caller with the voice response system 380.

Referring again to FIG. 4, there is shown a hyperlink 440, voice application development, which can be used to develop a voice application. As indicated above, the DT/6000 voice response system supports a voice application development environment. Conventionally, the voice application development environment is accessed using a voice application development menu option. The voice application development menu enables a programmer to develop a voice application using a voice application generator. A voice application governs the interaction between a voice response system and a caller by defining voice segments, voice tables and the like. Voice applications are well known within the art and therefore will not be described in detail (further information can be obtained from, for example, the Voice Application Development Guide SC22-0102 available from IBM Corporation).

However, selection of the voice application development hyperlink 440 causes the WWW client terminal 310 to send a suitable URL to the WWW server 330. The WWW server in response to the URL forwards an indication of the desired action to the VRS client 350. The VRS client 350 generates data in a format suitable for use by the voice response system according to the received data. The VRS client 350 then sends the generated data to the VRS server 370 which, in turn, instigates execution of the voice application generator.

Conventionally the output from the voice application generator is directed to and displayed on a local visual display unit via OS Presentation Manager or Motif in conjunction with X-Windows. However, upon instigation of the voice application generator by the VRS server 370 the former is arranged to direct all output, such as menus options, state tables, voice segments etc, to the VRS server. The VRS server 370 then directs that output to the VRS client 350. The VRS client 350 produces an HTML file therefrom for transmission to the WWW client terminal 310. The file displayed at the client terminal acts as a graphical user interface via which a user of the WWW client terminal can program or develop voice applications.

Inputs generated by the user of the WWW client terminal, such as the selection of menu options, edits to fields, etc, in response to the above HTML file are directed back to the VRS client. The VRS client 350 receives the HTML file and extracts therefrom data relevant to controlling the operation of the voice application generator, for example indications as to which menu options have been selected or files selected for editing, and passes that extracted data to the VRS server 370. The VRS server then passes the data to the voice application generator which responds accordingly thereby giving effect to the desired user action.

Therefore, the user of the WWW client terminal can use the voice application generator to generate a new voice application or modify an existing voice application via the Internet using an interface which is independent of the type of the WWW client terminal 310.

Furthermore, as access to the voice response system is by way of the Internet the expense associated with a leased line is obviated and the users need not concern themselves with the underlying communication protocol.

Figure 7:
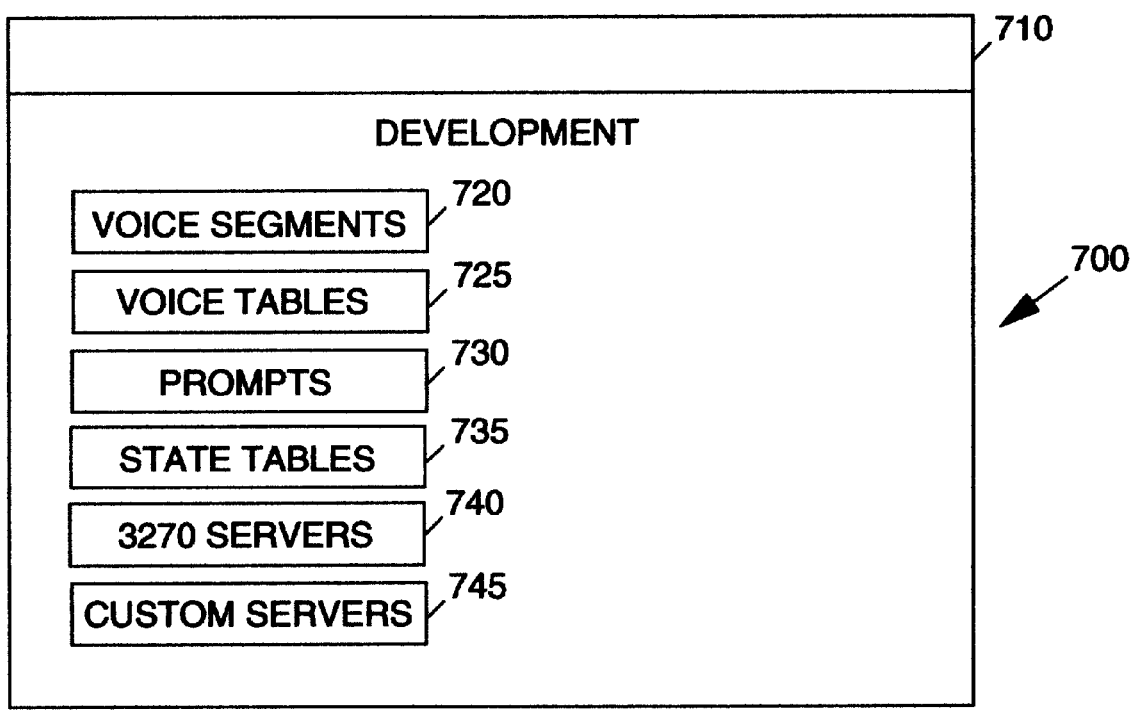
FIG. 7 shows a page for remotely invoking the voice application generator in order to develop a voice application program or state table.

Referring to FIG. 7, there is schematically shown the result of selecting the "Development" hyperlink 440 which allows voice applications to be developed. The screen 700 displayed comprises, as well as the conventional control bar 710, a plurality of hyperlinks 720 to 745 to features of the voice response system which can be programmed so as to influence the operation of the voice response system.

Selection of the hyperlink entitled "Voice tables" 725 by the user of the WWW client terminal 310 causes a URL to be sent via the Internet 320 and the WWW server 330 to the VRS client 350 containing an indication of said selection. The VRS client 350 generates control data appropriate to that selection and passes that control data via the VRS server to the input stream of the voice application generator. The voice application generator acts according to the control data and generates further output data which is forwarded to the VRS client via the VRS server. The VRS client generates an HTML file according to the data indirectly received from the voice application generator and transmits it to the WWW client terminal 310 for subsequent display.

Within the art of client-server computing. it is well established that a client may also function as a server and visa-versa according to whether the machine upon which the client or server is implemented requests or provides data. For example, from the perspective of the WWW server 330 the VRS client 350 provides information whereas from the perspective of the VRS server 370 the VRS client 350 requests information.

We claim:

1. A client-server system for interfacing between a WWW client terminal arranged to access said client-server system via the Internet World Wide Web and a voice response system having a voice response system server and a connection to the telephone network for receiving calls therefrom, said client-server system comprising:

generation means for generating data in a first format useable by said WWW client terminal from data in a second format received from said voice response system and for generating data in a format useable by said voice response system from data in a format received from WWW client terminal;

wherein said generation means comprises means, responsive to data originating from said WWW client terminal, to generate data for use by said voice response system in controlling the future operation of said voice response system for processing calls received from the telephone network.

2. A method of generating a software application capable of controlling a voice response system connected to the telephone network for receiving calls therefrom, said method comprising the steps of interfacing a client terminal to a server via the Internet World Wide Web, interfacing the server to the voice response system via a generating means, generating data in the generation means in a first format useable by said client terminal from data received from said voice response system, displaying the data in the first format at the client terminal, generating data useable by said voice response system from data received from the client terminal, and responsive to predefined commands from the client terminal, generating data to control said voice response system to generate a voice response software application which when executed controls the future operation of said voice response system in processing calls received from the telephone network.

3. The system of claim 1, wherein the data generated for use by said voice response system for controlling the future operation of said voice response system comprises telephony configuration data.

4. The system of claim 1, wherein the data for use by said voice response system for controlling the future operation of said voice response system comprises a new or modified voice response application which is executed to control the processing of calls received from the telephone network.

* * * * *